United States Patent
Tsukishima et al.

(10) Patent No.: US 12,022,247 B2
(45) Date of Patent: Jun. 25, 2024

(54) DATA COMMUNICATION SYSTEM, COMPUTER, DATA COMMUNICATION METHOD, AND PROGRAM

(71) Applicant: Nippon Telegraph and Telephone Corporation, Tokyo (JP)

(72) Inventors: Yukio Tsukishima, Musashino (JP); Toru Mano, Musashino (JP); Takahiro Yamaguchi, Musashino (JP); Yasuhiro Mochida, Musashino (JP); Tomoya Hibi, Musashino (JP); Junki Ichikawa, Musashino (JP); Daisuke Shirai, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 78 days.

(21) Appl. No.: 17/920,210

(22) PCT Filed: Apr. 21, 2020

(86) PCT No.: PCT/JP2020/017132
§ 371 (c)(1),
(2) Date: Oct. 20, 2022

(87) PCT Pub. No.: WO2021/214850
PCT Pub. Date: Oct. 28, 2021

(65) Prior Publication Data
US 2023/0179894 A1    Jun. 8, 2023

(51) Int. Cl.
*H04Q 11/00* (2006.01)
*G06F 13/28* (2006.01)

(52) U.S. Cl.
CPC ......... *H04Q 11/0005* (2013.01); *G06F 13/28* (2013.01); *G06F 2213/28* (2013.01)

(58) Field of Classification Search
CPC .. H04Q 11/0005; G06F 13/28; G06F 2213/28
(Continued)

(56) References Cited

U.S. PATENT DOCUMENTS

| 10,375,458 B2 * | 8/2019 | Leigh .................... H04J 14/028 |
| 2006/0171712 A1 * | 8/2006 | Tanaka ............... H04Q 11/0062 |
| | | 398/45 |

(Continued)

FOREIGN PATENT DOCUMENTS

| JP | 2006215815 | 8/2006 |
| JP | 2013150339 | 8/2013 |
| JP | 2014119930 | 6/2014 |

OTHER PUBLICATIONS

Asai, "Data Center Network for Supporting PFN Distributed Deep Learning Infrastructure MN-2," Internet Week 2019 Session, Nov. 26-29, 2019, 26 pages.

(Continued)

*Primary Examiner* — Dalzid E Singh
(74) *Attorney, Agent, or Firm* — Fish & Richardson P.C.

(57) ABSTRACT

An object of the present disclosure is to provide a data communication system, a computing apparatus, a data communication method, and a program, which are capable of highly reliable data transfer with low latency between computing apparatuses. The present disclosure achieves a highly reliable communication path by directly connecting computing apparatuses via an optical path and transmitting data through the optical path. Further, the present disclosure uses the optical path to achieve RDAM over wavelength transmission in which existing RDMA-enabled protocol stacks such as InfiniBand and TCP/IP/Ether are eliminated. The present disclosure eliminates the protocol stacks, enabling transfer with lower latency than in a case of "simply performing RDMA transmission over the wavelength path".

6 Claims, 8 Drawing Sheets

(58) Field of Classification Search
USPC .......................................................... 398/45
See application file for complete search history.

(56) References Cited

U.S. PATENT DOCUMENTS

2013/0308942 A1* 11/2013 Ji .......................... H04B 10/801
   398/68
2017/0331548 A1* 11/2017 Kim ...................... H04L 1/0036

OTHER PUBLICATIONS

IETF, "A Remote Direct Memory Access Protocol Specification," RFC 5040, Oct. 2007, 66 pages.

IETF, "Remote Direct Memory Access (ROMA) Protocol Extensions," RFC 7306, Jun. 2014, 34 pages.

International Telecommunication Union, "Series G: Transmission Systems and Media, Digital Systems and Networks," ITU-T G.975.1, Feb. 2004, 58 pages.

Okamoto, "MPLS and GMPLS—Provision of Service and Technology for Supporting Transmission of the Same," T19 Internet Week 2006, 52 pages (with Partial English Translation).

Open Networking Foundation, "SON Architecture for Transport Networks," ONF TR-522, Mar. 15, 2016, 17 pages.

Shimoto, "Outline and Standardization Trend of GMPLS," NTT Technical Journal, Apr. 2004, pp. 60-63, 9 pages.

The Telecommunication Technology Committee, "TR-1003, Technical Report on Interface of Optical Transport Network (OTN)," TCC Technical Report, Feb. 20, 2002, 101 pages (with Partial English Translation).

The Telecommunication Technology Committee, "TR-GSup.39, Optical System Design and Engineering Considerations," TCC Technical Report, Feb. 10, 2017, 133 pages (with Partial English Translation).

Zhu et al., "Congestion Control for Large-Scale ROMA Deployments," SIGCOMM 2015, Aug. 17-21, 2015, 14 pages.

\* cited by examiner

[7]

DATA COMMUNICATION SYSTEM, COMPUTER, DATA COMMUNICATION METHOD, AND PROGRAM

CROSS-REFERENCE TO RELATED APPLICATIONS

This application is a National Stage application under 35 U.S.C. § 371 of International Application No. PCT/JP2020/017132, having an International Filing Date of Apr. 21, 2020, the disclosure of which is considered part of the disclosure of this application, and is incorporated by reference in its entirety into this application.

TECHNICAL FIELD

The present disclosure relates to a protocol free technology and an innovative optical interface technology.

BACKGROUND ART

Data communications between computing apparatus systems use Remote Direct Memory Access (RDMA) technology for speeding up communication processing (see, for example, Non Patent Literature (NPL) 1 and NPL 2). However, the RDMA technology is designed on the assumption that no signal loss occurs in communications between computing apparatus systems and properly operates when no signal loss occurs.

Communications between computing apparatus systems using the RDMA technology needs to eliminate the occurrence of packet loss in the network between the computing apparatus systems. For the network, data communication via the RDMA technology is given a high priority, and signals are transferred by controlling preferential process to eliminate the occurrence of signal loss. For example, data communication signals are encapsulated by IP, Ethernet (Registered trademark), InfiniBand, or the like to be given a priority and transferred through the network as IP, Ethernet, or InfiniBand with the priority given (see, for example, NPL 3 and NPL 4).

CITATION LIST

Non Patent Literature

NPL 1: IETF, "A Remote Direct Memory Access Protocol Specification", RFC 5040, October 2007
NPL 2: IETF, "Remote Direct Memory Access (RDMA) Protocol Extensions", RFC 7306, June 2014
NPL 3: Yibo Zhu et al., "Congestion Control for Large-Scale RDMA Deployments", SIGCOMM 2015, Aug. 17-21, 2015
NPL 4: Hirochika Asai, "Data Center Network for Supporting PFN Distributed Deep Learning Infrastructure MN-2", Internet Week 2019 Session "Latest Trend of Ultra High Speed Ultra Low Latency Network", Nov. 26-29, 2019
NPL 5: Kouhei Shiomoto, "Outline and Standardization Trend of GMPLS", pp. 60-63, NTT Technical Journal, April 2004
NPL 6: Satoru Okamoto, "MPLS and GMPLS—Provision of Service and Technology for Supporting Transmission of the Same-", T19, Internet Week 2006
NPL 7: Open Networking Foundation, "SDN Architecture for Transport Networks", ONF TR-522, Mar. 15, 2016
NPL 8: General Incorporated Association: The Telecommunication Technology Committee, "TR-1003, Technical Report on Interface of Optical Transport Network (OTN)", TTC Technical Report, Feb. 20, 2002
NPL 9: General Incorporated Association: The Telecommunication Technology Committee, "TR-GSup.39, Optical System Design and Engineering Considerations", TTC technical report, Feb. 10, 2017
NPL 10: ITU-T G.975.1

SUMMARY OF THE INVENTION

Technical Problem

Unfortunately, these technologies encapsulate data signals by IP, Ethernet, InfiniBand, or the like to suppress signal loss, and processing latency is generated consequently, making it difficult to sufficiently speed up communication processing.

To solve the above problem, an object of the present disclosure is to provide a data communication system, a computing apparatus, a data communication method, and a program, which are capable of highly reliable data transfer with low latency between computing apparatuses.

Means for Solving the Problem

To achieve the above object, a data communication system according to the present disclosure directly connects two computing apparatuses via a dedicated optical path for optical communication having an error correction function and performs DMR or RDMA transfer via the optical path without a signal format of a layer 2 or 3.

Specifically, a data communication system according to the present disclosure having two computing apparatuses connected via an optical path includes a main storage device that drives an application unit having data to be transmitted and received between the two computing apparatuses, a light signal physical unit that transmits and receives a light signal frame having an error correction portion with respect to the optical path, a light signal processing unit that converts the data into the light signal frame and vice versa, and a direct memory access controller that causes the light signal frame to be transmitted and received via the optical path to transfer the data between the respective application unit of the two computing apparatuses by direct memory access or remote direct memory access.

In addition, a computing apparatus according to the present disclosure connected to another computing apparatus via an optical path includes a main storage device that drives an application unit having data to be transmitted and received between the computing apparatus and the other computing apparatus, a light signal physical unit that transmits and receives a light signal frame having an error correction portion with respect to the optical path, a light signal processing unit that converts the data into the light signal frame and vice versa, a direct memory access controller that causes the light signal frame to be transmitted and received via the optical path to transfer the data between the respective application unit of the computing apparatus and the other computing apparatus by direct memory access or remote direct memory access.

Further, a data communication method according to the present disclosure in a data communication system having two computing apparatuses connected via an optical path includes driving an application unit having data to be transmitted and received between the two computing apparatuses, transmitting and receiving a light signal frame having an error correction portion with respect to the optical path, converting the data into the light signal frame and vice versa, and transmitting and receiving the light signal frame via the optical path to transfer the data between the respective application unit of the two computing apparatuses by direct memory access or remote direct memory access.

The present data communication system eliminates upper protocols (such as IP/Ethernet/InfiniBand) used in the known RDMA, enabling data communication with low latency. In addition, connecting the two computing apparatuses via the optical path does not cause packet loss due to conflicts, and the communication adopts an error correction scheme, enabling a highly reliable system.
That is, the present disclosure includes an error correction function and uses a light signal with reduced packet loss as an RMDA signal, which is considerably affected by the packet loss, thus enabling a highly reliable system.

Therefore, the present disclosure may provide a data communication system, a computing apparatus, a data communication method, and a program, which are capable of highly reliable data transfer with low latency between computing apparatuses.

The data communication system according to the present disclosure further includes an optical switch that establishes the optical path. Setting the optical path for the optical switch further improves the reliability because no conflict of the light signal occurs.

The data communication system according to the present disclosure further includes an optical path controller that controls the connection of the optical switch and establishes and deletes the optical path. A counterpart for which the optical path is set can be switched.

The present disclosure is a program for causing a computer to operate as the computing apparatus. The computing apparatus according to the present disclosure may also be implemented by a computer and a program, and the program may also be recorded in a recording medium and provided through a network.

Each aspect of the disclosures described above can be combined as much as possible.

Effects of the Invention

The present disclosure may provide a data communication system, a computing apparatus, a data communication method, and a program, which are capable of highly reliable data transfer with low latency between computing apparatuses.

DESCRIPTION OF EMBODIMENTS

Embodiments of the present disclosure will be described with reference to the accompanying drawings. The embodiments described below are examples of the present disclosure and the present disclosure is not limited to the embodiments described below. Note that constituent elements with the same reference signs in the specification and the drawings are assumed to be the same constituent elements.

Overview

It is common to use RDMA as high speed data communication between two computing apparatuses. Because RDMA requires a highly reliable communication path with no packet loss, it is necessary to use RDMA on TCP having a retransmission function or on priority-controlled IP/Ethernet, so as to secure reliability.

The present disclosure achieves a highly reliable communication path by directly connecting computing apparatuses via an optical path and transmitting data through the optical path. Further, the present disclosure achieves RDAM over wavelength transmission in which existing RDMA-support protocol stacks such as InfiniBand, TCP/IP/Ether and the like are eliminated by utilizing the optical path. The present disclosure may achieve transfer with lower latency than in a case of "simply performing RDMA transmission over the wavelength path", by eliminating the protocol stacks. Hereinafter, the invention will be described with reference to a specific data communication system.

First Embodiment

Figure 1:
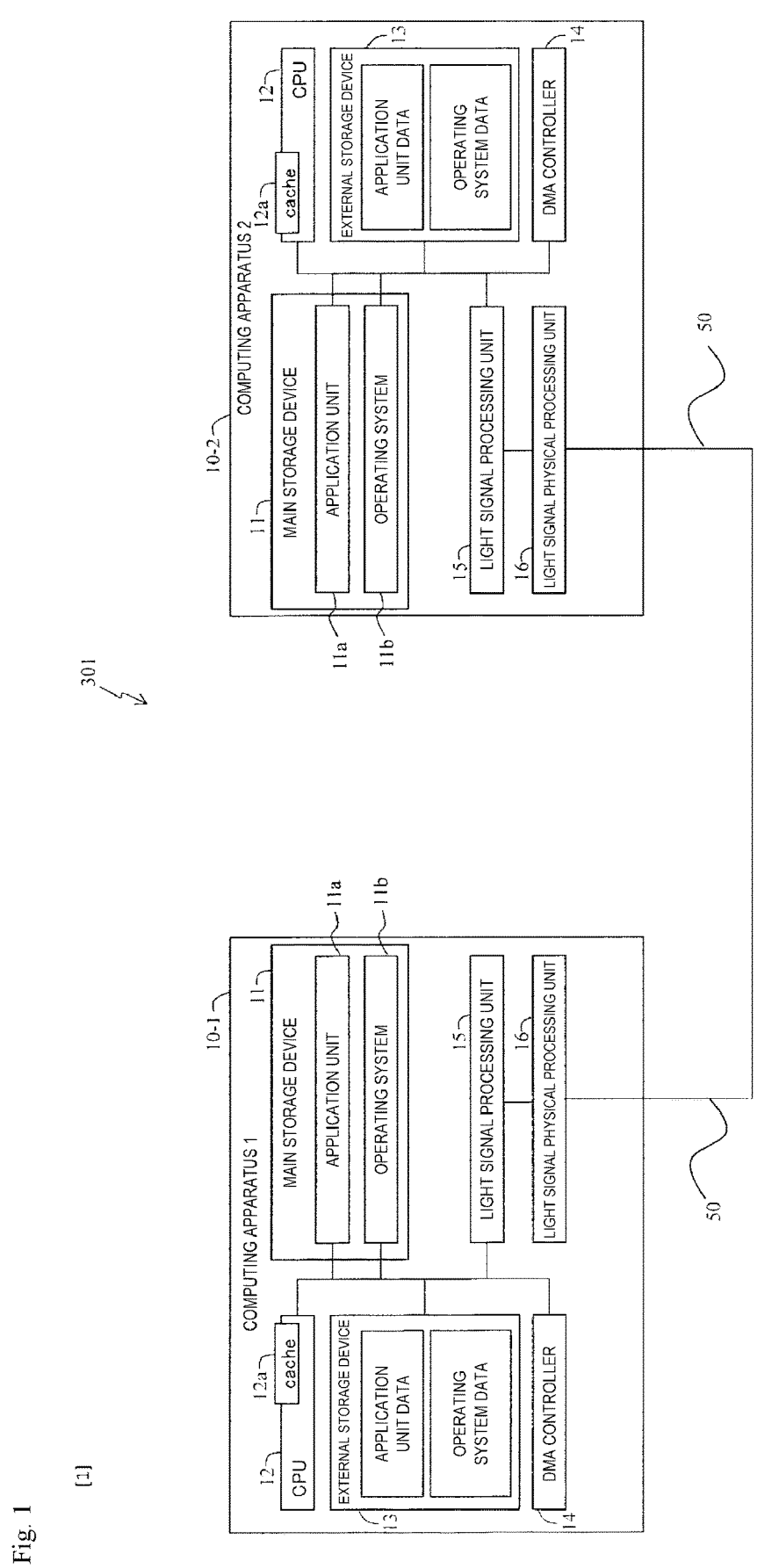
FIG. 1 is a diagram for explaining a data communication system according to the present disclosure.

FIG. 1 is a diagram for explaining a data communication system 301 of the present embodiment. The data communication system 301 having two computing apparatuses (10-1 and 10-2) connected via an optical path 50 includes a main storage device 11 that drives an application unit 11a having data to be transmitted and received between the two computing apparatuses, a light signal physical unit 16 that transmits and receives a light signal frame having an error correction portion with respect to the optical path 50, a light signal processing unit 15 that converts the data into the light signal frame and vice versa, and a direct memory access controller 14 that causes the light signal frame to be transmitted and received via the optical path 50 and causes the data to be transferred between an application unit of a computing apparatus of the two computing apparatuses and an application unit of another computing apparatus of the two computing apparatuses by direct memory access or remote direct memory access.

The data communication system 301 connects the computing apparatuses 10 to each other with the optical path 50, in which no packet loss is substantially generated. The optical path 50 is, for example, an Optical Data Unit (ODU) defined by ITU-T G.709, and the ODU is a signal that is provided with at least one error correcting signal and is transmitted between terminating points (see, for example, NPL 8 and NPL 9). Examples of the setting and deletion of the optical path 50 and the control of the light signal frame transmission include a distributed control model such as Generalized Multi Protocol Label Switching (GMPLS) (see, for example, NPL 5 and NPL 6), or a centralized control model such as Software Defined Network (SDN), Network Management System (NMS)/Element Management System (EMS) or the like (see, for example, NPL 7).

The computing apparatuses (10-1 and 10-2) each include the main storage device 11 configured to store the application unit 11a and an operating system 11b, a CPU 12 equipped with a cache 12a configured to drive part of or all of the application unit 11a, an external storage device 13, the direct memory access controller 14, and the light signal physical processing unit 16.

The computing apparatus 10-1 and the computing apparatus 10-2 communicate light signal frames with error correction functions via the respective light signal physical processing units 16. At this time, the computing apparatuses (10-1 and 10-2) perform the direct memory access transfer not through the signal format of the layer 2 or layer 3 such as IP, Ethernet, InfiniBand or the like on the light signal.

The computing apparatuses (10-1 and 10-2) each further include the light signal processing unit 15 and the application unit 11a to be driven on the main storage device 11. The light signal processing unit 15 is, for example, an Optical Data Unit (ODU) interface.

The direct memory access transfer or remote direct memory access transfer by the DMA controller 14 is performed between the application unit 11a of the computing apparatus 10-1 and the application unit 11a of the computing apparatus 10-2.

The application unit 11a has a function of transmitting and receiving data to and from the light signal processing unit 15. The light signal processing unit 15 has a function of transmitting and receiving data to and from the application unit 11a, a function of converting data received from the application unit 11a into a light signal frame and transmitting the light signal frame to the light signal physical processing unit 16, and a function of receiving a light signal frame from the light signal physical processing unit 16 and extracting data therefrom.

Figure 2:
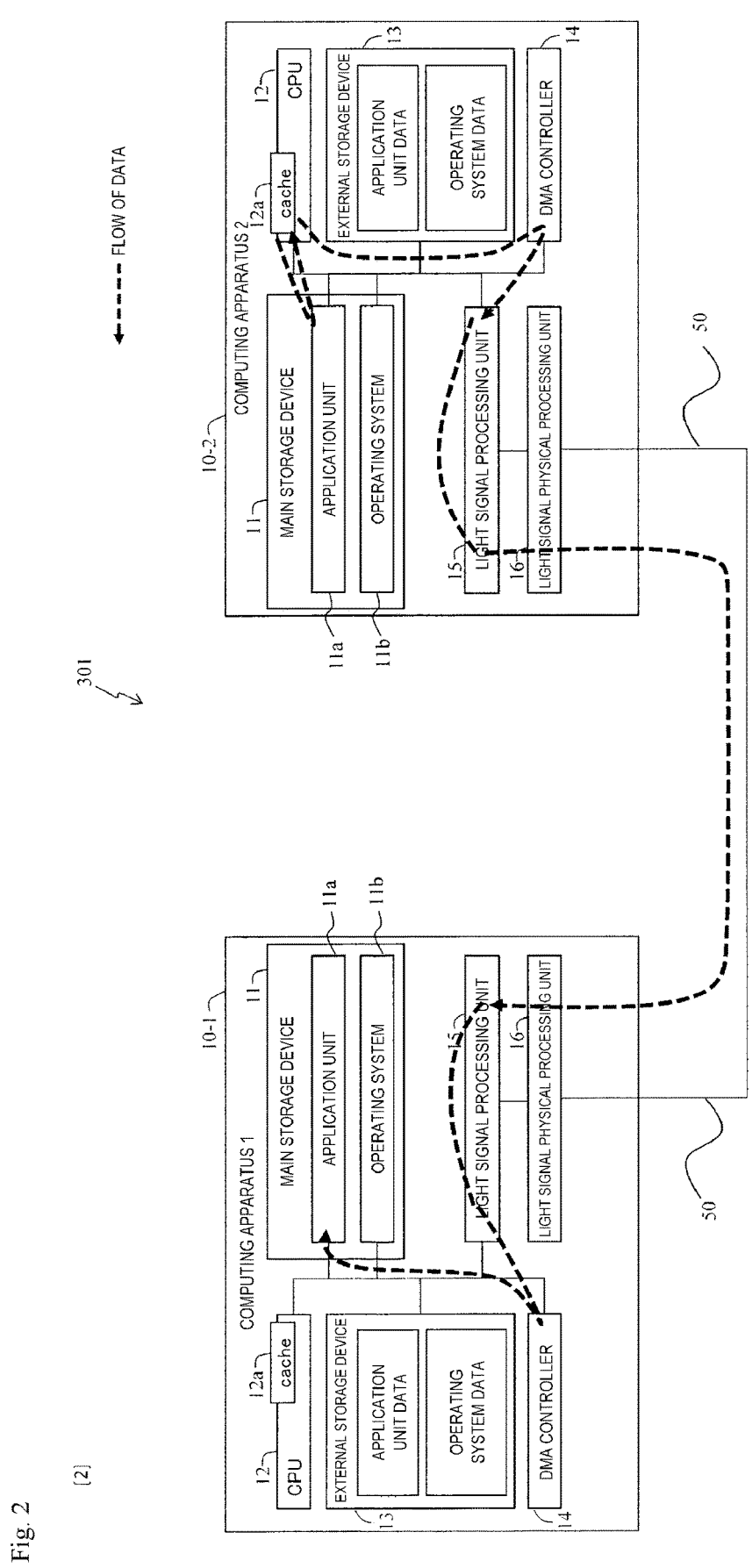
FIG. 2 is a diagram for explaining a data communication system according to the present disclosure.

FIG. 2 is a diagram for explaining a data flow when the data communication system 301 performs a direct memory access transfer. In this example, an example of transferring data from the computing apparatus 10-2 to the computing apparatus 10-1 will be described.

Data of the application unit 11a of the computing apparatus 10-2 is accumulated in the cache 12a or in the application unit 11a of the main storage device 11. A file of the application unit 11a is stored in the external storage device 13, and when executed, the file is first deployed on the main storage device 11. Part of the application unit 11a is stored in the cache 12a of the CPU in such a manner that high speed processing by the CPU is achieved. The DMA controller 14 of the computing apparatus 10-2 reads the data in the cache 12a (DMA Read) and moves the read data to the light signal processing unit 15 of the computing apparatus 10-2 in order to transfer it to the computing apparatus 10-1 (RDMAS Send). The light signal processing unit 15 converts the above data into a light signal frame. An error correcting code is also assigned to the light signal frame. The light signal physical processing unit 16 of the computing apparatus 10-2 transmits this light signal frame to the optical path 50.

The light signal physical processing unit 16 of the computing apparatus 10-1 receives the above light signal frame from the optical path 50. Subsequently, the light signal processing unit 15 of the computing apparatus 10-1 converts the signal frame into data. The DMA controller 14 of the computing apparatus 10-1 confirms that the data is the one from the computing apparatus 10-2 (RDMA Receive), and then delivers the data to the main storage device 11 of the computing apparatus 10-1 (DMA Write). As described above, the application unit 11a of the computing apparatus 10-1 receives the data.

Thus, the data communication system 301 converts the data directly into a light signal frame and carries out the data transfer by RDMA using the optical path 50. By carrying out the data transfer using the optical path 50, data loss between the computing apparatuses 10 is suppressed. The data communication system 301 achieves the RDMA transfer while avoiding the encapsulation of data in the IP, Ethernet, InfiniBand, or the like, in which processing latency occurs, by directly converting the data into the light signal frame.

The data communication system 301 may reduce layers because of no encapsulation being made. In the data communication system 301, for example, the function of a signal-synchronization signal such as a preamble mounted in a light signal of ODU or the like, and the function of a signal-synchronization signal such as a preamble mounted in a layer-2 signal of Ethernet or the like are redundant due to the layer elimination, so that the signal synchronization processing functions may also degenerate into the one on the light signal side only. Because of this, the data communication system 301 may reduce processing latency at the start of communication.

It is possible for the data communication system 301 to prevent the generation of packet loss in the communications between the computing apparatuses 10 by two points as follows.

(1) By directly connecting the computing apparatuses 10 with the optical path, packet loss due to conflicts does not occur.

More specific description will be made. First, an optical path is constituted by setting an optical switch or the like by signaling before the start of communication with a main signal. The optical path is in a state in which a start point and a termination point are fixedly connected. Because of this, a main signal of another optical path having a start point and a termination point different from those described above does not overlap the optical path. With this, in the optical transmission system using the optical path, a packet loss caused by a buffer shortage because of scrambling for the same buffer region within a group of packets whose output destinations are the same does not occur in principle, unlike in a packet communication system.

Figure 3:
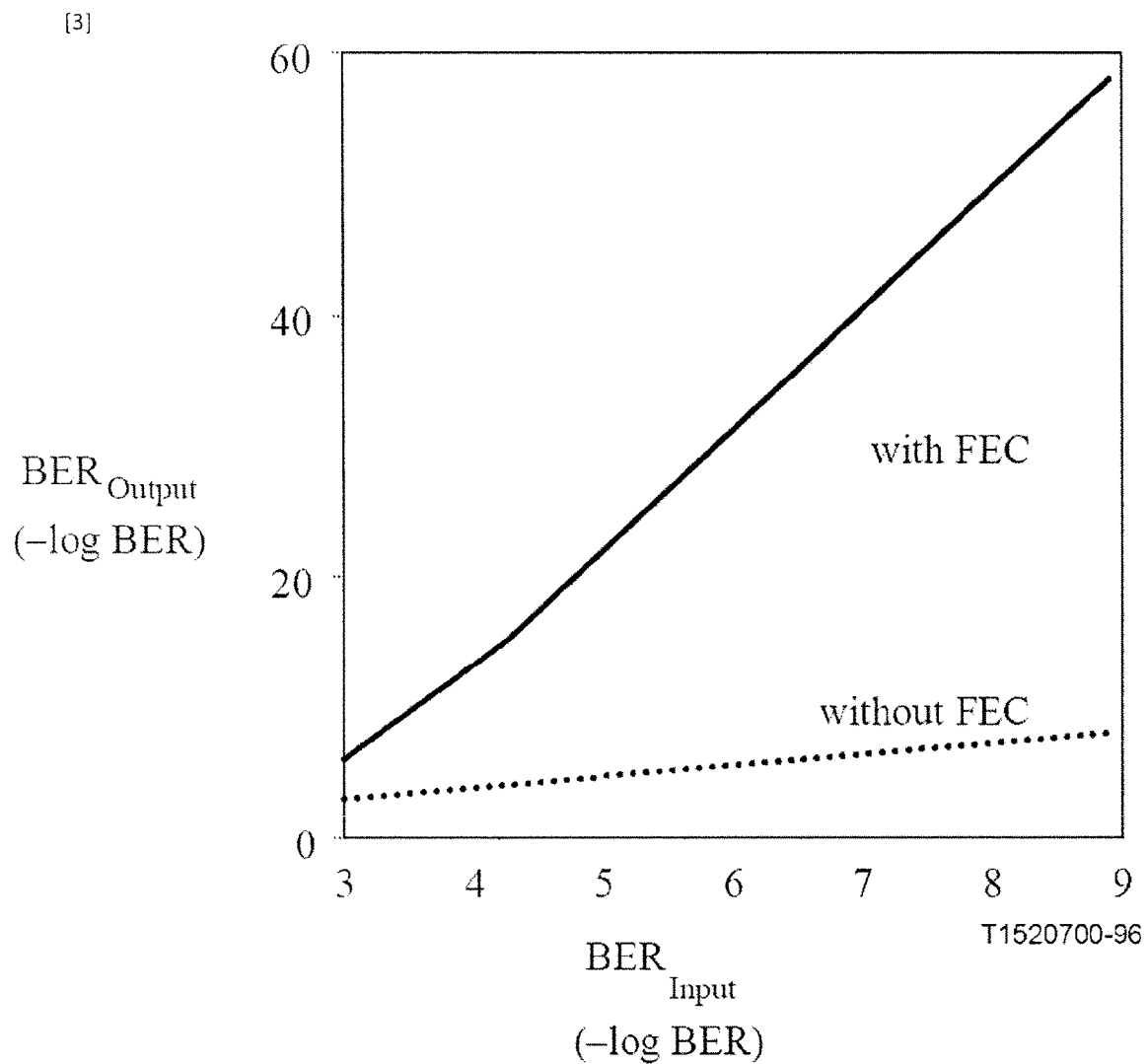
FIG. 3 is a diagram for explaining an effect of a data communication system according to the present disclosure.
Figure 4:
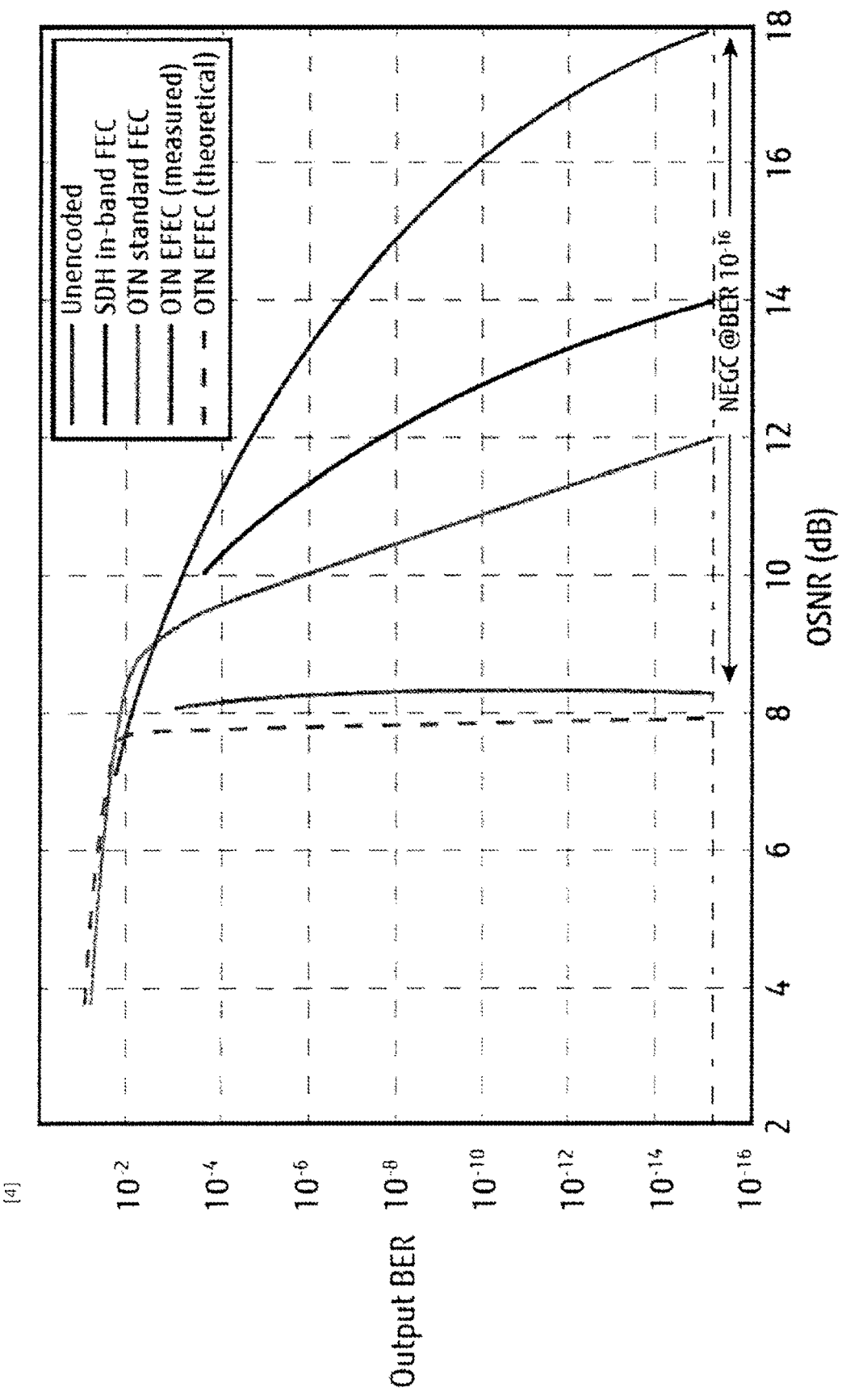
FIG. 4 is a diagram for explaining an effect of a data communication system according to the present disclosure.

(2) By assigning an error correcting code (FEC) to a light signal frame, a bit error rate (BER) is significantly improved. FIG. 3 is a diagram in which a BER in a case of the error correcting code being assigned to a light signal frame and a BER in a case of the error correcting code being not assigned to a light signal frame are compared. By assigning the error correcting code to the light signal frame, the BER may be improved by two or more orders of magnitude compared to the case of not assigning the error correcting code. The error correcting code may be applied to the light signal multiple times. In a case of using OTN Standard FEC (GFEC) defined in ITU-T G.975, the BER may be improved by five or more orders of magnitude as depicted in FIG. 4. SDH in band FEC and OTN Enhanced FEC (EFEC) are also defined in ITU-T G.975 (see, for example, NPL 10).

In the present embodiment, the optical path has been described as an ODU, but the optical path is not limited thereto. The optical path may not be the ODU as long as the light signal with an error correction function assigned is used.

Second Embodiment

Figure 5:
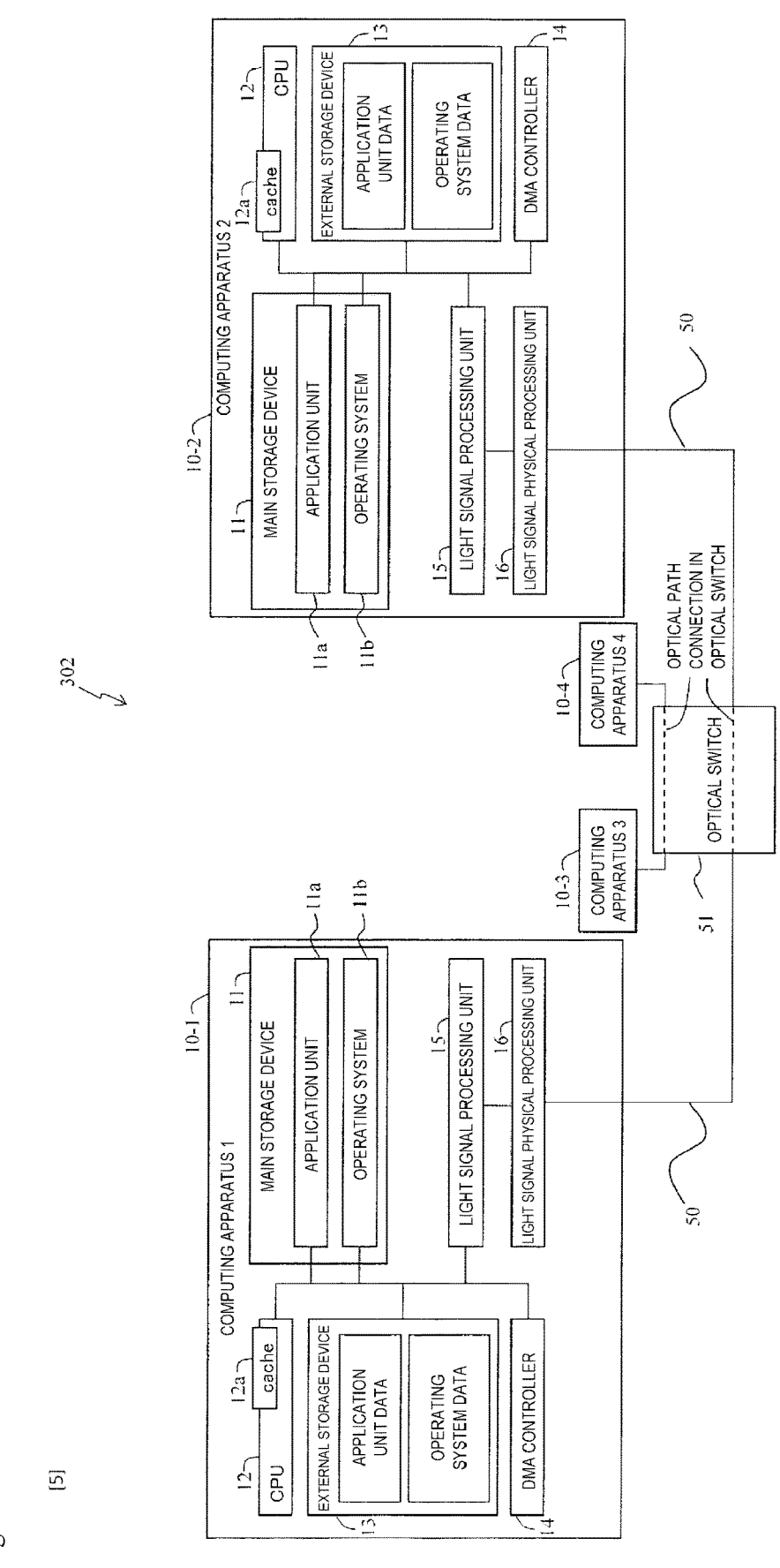
FIG. 5 is a diagram for explaining a data communication system according to the present disclosure.

FIG. 5 is a diagram for explaining a data communication system 302 of the present embodiment. The data communication system 302 further includes an optical switch 51 configured to establish the optical path 50 with respect to the data communication system 301 of FIG. 1. That is, a feature of the data communication system 302 is such that at least one optical switch 51 is disposed between the computing apparatus 10-1 and the computing apparatus 10-2, and a light signal frame between the computing apparatus 10-1 and the computing apparatus 10-2 passes through the optical switch 51.

Because the data communication system 302 sets the optical path between the computing apparatus 10-1 and the computing apparatus 10-2 via the optical switch 51, the computing apparatus 10-1 may also set an optical path between the computing apparatus 10-1 and a computing apparatus 10-3, for example, by changing the setting of the optical switch 51. Further, as illustrated in FIG. 5, by the setting of the optical switch 51, the optical path is set between the computing apparatus 10-1 and the computing apparatus 10-2, and an optical path may also be set between the computing apparatus 10-3 and a computing apparatus 10-4.

The following two points are causes for a decrease in transfer rate of RDMA.
(1) Bit error
(2) Output buffer shortage in packet switch systems such as IP routers, Ethernet switches, infiniBand switches and the like This causes the conflicts to occur at the output destination of the packet group.

The cause (1) may be resolved by OTN error correction. As for the cause (2), in a case where a plurality of server-client communications are generated in a packet switch network, packet conflicts occur in a probabilistic manner. Thus, in the present embodiment, the optical switch 51 is employed in such a manner that packet conflicts do not occur in principle. The packet conflicts do not occur in principle as long as the optical switch 51 has succeeded in establishing the optical path.

In addition, because the optical switch changes an input port and an output port by a mirror like a mirror type, a high level of processing such as reading a header like an IP packet is unnecessary, so that a reduction in transfer rate caused by the above processing can be prevented.

Third Embodiment

Figure 6:
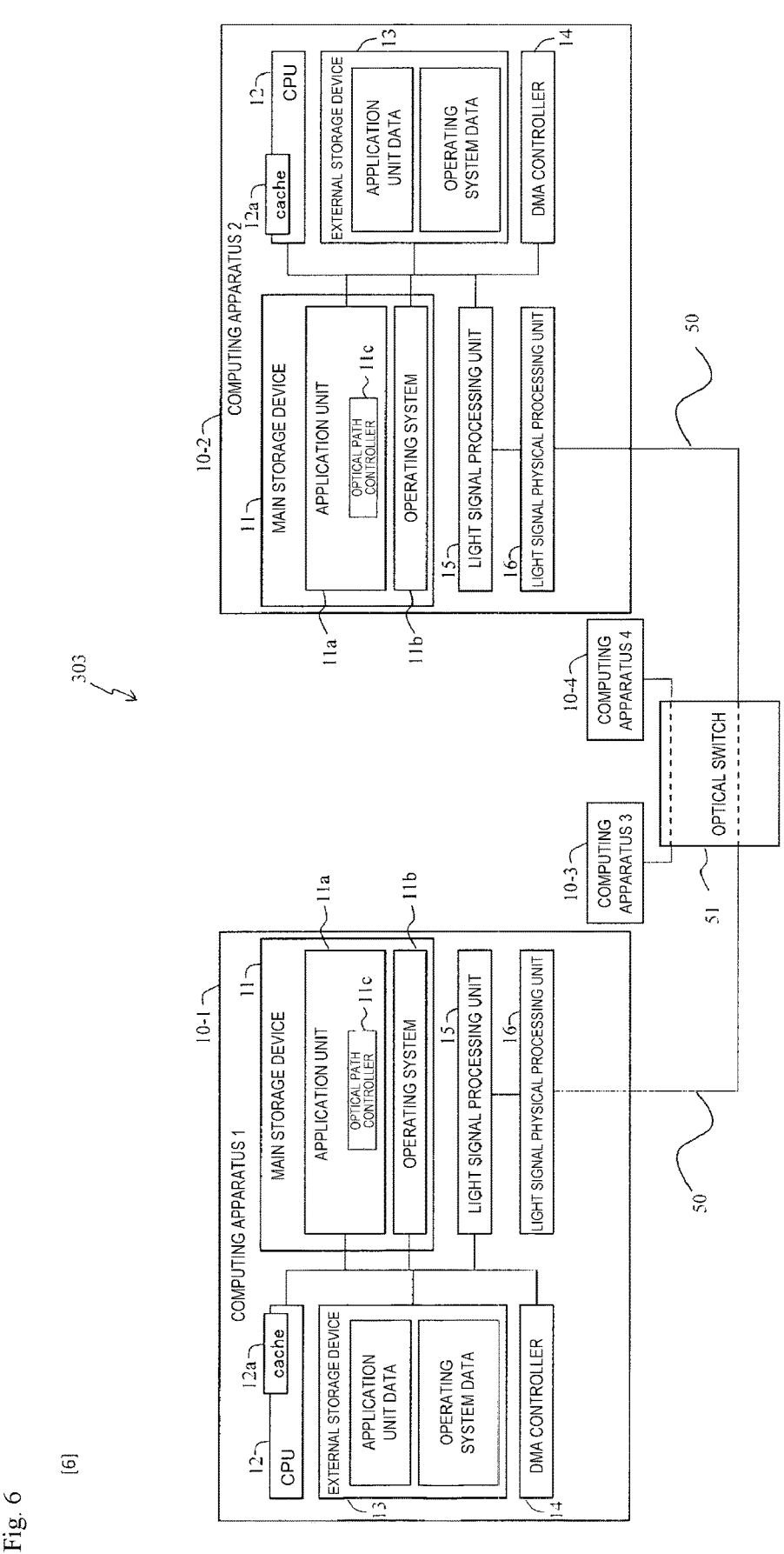
FIG. 6 is a diagram for explaining a data communication system according to the present disclosure.

FIG. 6 is a diagram for explaining a data communication system 303 of the present embodiment. The data communication system 303 further includes, with respect to the data communication system 302 of FIG. 5, optical path controllers 11c configured to control the connection of the optical switch 51 and establish and delete the optical path 50. That is, the data communication system 303 includes computing apparatuses (10-1 and 10-2) each including the optical path controller 11c exchanges an optical path control message between the computing apparatuses (10-1 and 10-2), and dynamically set or delete the optical path 50.

The data communication system 303 utilizes the optical path controller 11c to dynamically change an input port and an output port of the optical switch 51. This function allows the data communication system 303 to set the optical path between the computing apparatus 10-1 and the computing apparatus 10-2, and also set an optical path between the computing apparatus 10-1 and the computing apparatus 10-3. The optical path controller 11c may be achieved by the technologies described in NPL 5 to NPL 7.

Fourth Embodiment

Figure 7:
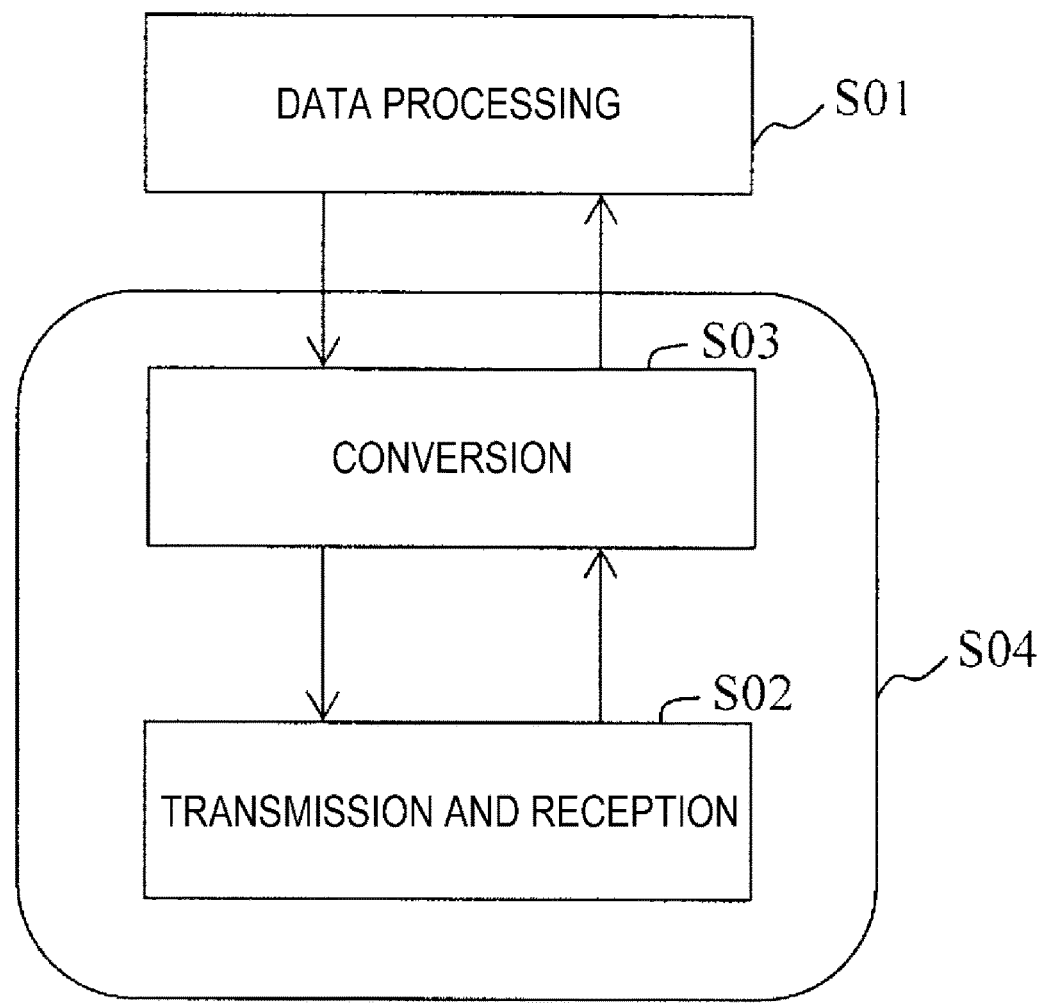
FIG. 7 is a diagram for explaining a data communication method according to the present disclosure.

FIG. 7 is a diagram for explaining a data communication method in the data communication systems 301 to 303 described above. The present data communication method includes driving the application unit 11a having data to be transmitted and received between the computing apparatuses (10-1 and 10-2) (step S01), transmitting and receiving a light signal frame having an error correction portion with respect to the optical path 50 (step S02), converting the data into the light signal frame and vice versa (step S03), and transmitting and receiving the light signal frame via the optical path 50 to transfer the data between the application unit of the computing apparatus and an application unit of the other computing apparatus by direct memory access or remote direct memory access (step S04).

In the computing apparatus 10 on the transmission side, the light signal processing unit 15 converts data into the light signal frame (step S03). Subsequently, in the computing apparatus 10 on the transmission side, the light signal physical processing unit 16 transmits the light signal frame to the optical path 50 (step S02). On the other hand, in the computing apparatus 10 on the reception side, the light signal physical processing unit 16 receives the light signal frame from the optical path 50 (step S02). Subsequently, in the computing apparatus 10 on the reception side, the light signal processing unit 15 converts the light signal frame into data (step S03). Then, the application unit 11a of the computing apparatus 10 on the reception side receives the data and performs data processing (step S01). In this case, step S02 and step S03 are the direct memory access transfer or remote direct memory access transfer by the DMA controller 14 (step S04).

The setting of the optical path 50 is made in the following manner. In the case of a GMPLS control network, a transmission source (start point) and a transmission destination (termination point) are determined, and then a relay route is determined by IP routing. Thereafter, the optical path controller 11c performs signaling for setting the optical switch 51 from the start point to the termination point (start point, termination point, relay point). By this signaling, the optical switch 51 serves to change or connect an input port and an output port so as to build the optical path 50.

Fifth Embodiment

The computing apparatus 10 may also be implemented by a computer and a program, and the program may also be recorded in a recording medium and provided through a network.

Figure 8:
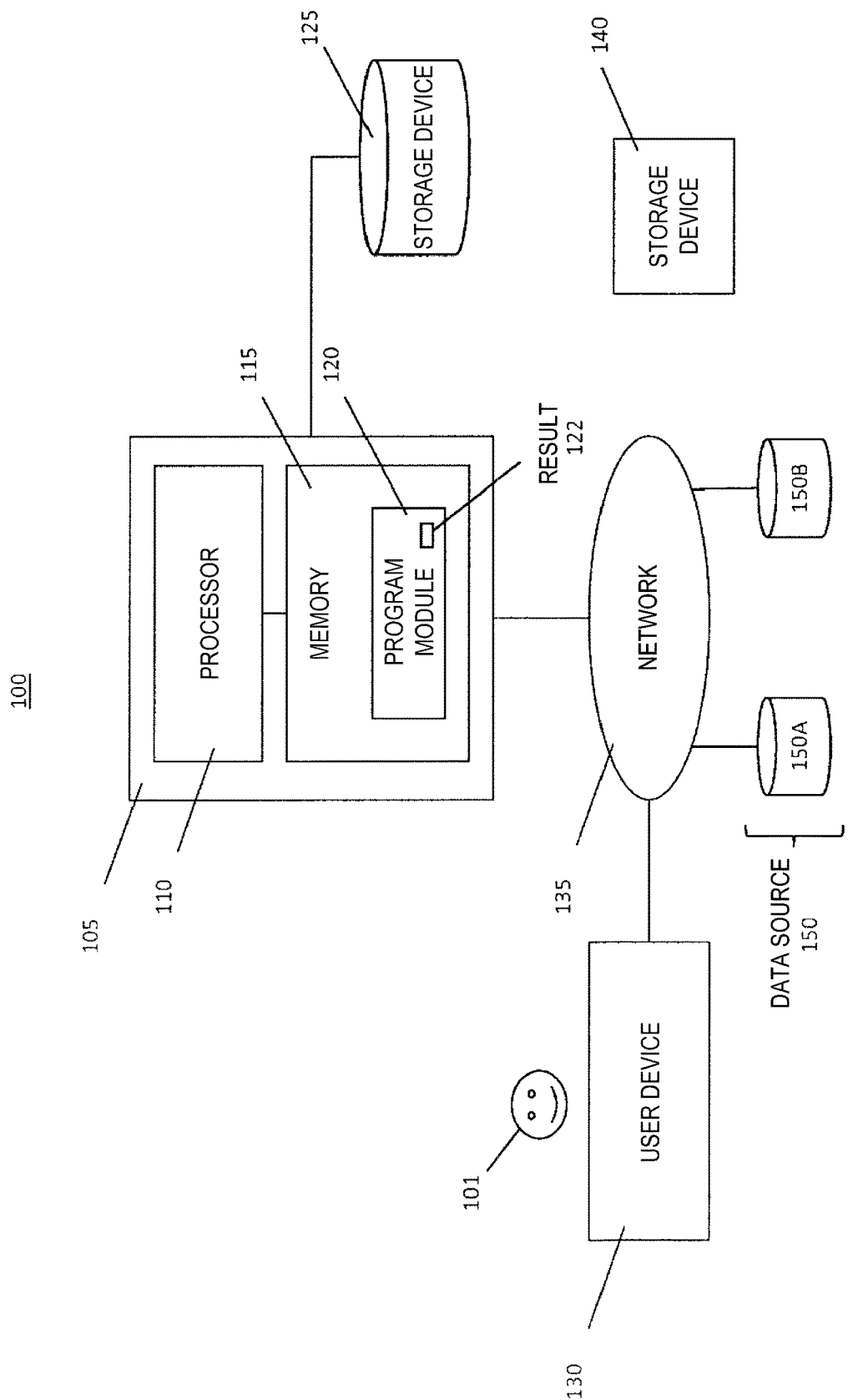
FIG. 8 is a diagram for explaining a data communication system according to the present disclosure.

FIG. 8 is a block diagram illustrating a system 100. The system 100 includes a computer 105 connected to a network 135.

The network 135 is a data communication network. The network 135 may be a private network or a public network and can include any one of (a) a personal area network covering a certain room, for example, (b) a local area network covering a certain building, for example, (c) a campus area network covering a certain campus, for example, (d) a metropolitan area network covering a certain city, for example, (e) a wide area network covering areas being connected across boundaries of urban areas, rural areas, or nations, for example, or (f) the Internet, or all of them. The communication is performed by electronic signals and light signals via the network 135.

The computer 105 includes a processor 110 and a memory 115 connected to the processor 110. Although the computer 105 is represented herein as a standalone device, it is not so limited, but rather may be connected to other devices not illustrated in a distributed processing system.

The processor 110 is an electronic device configured with logic circuitry that responds to and executes instructions.

The memory 115 is a storage medium readable to a tangible computer with a computer program encoded therein. In this regard, the memory 115 stores data and instructions, that is, a program code, readable and executable by the processor 110 to control operation of the processor 110. The memory 115 can be implemented in a random access memory (RAM), a hard drive, a read-only memory (ROM), or a combination thereof. One of constituent elements of the memory 115 is a program module 120.

The program module 120 includes instructions for controlling the processor 110 to execute the processes described herein. Although operations are described herein as being performed by the computer 105 or a method or a process or a sub-process thereof, the operations are actually performed by the processor 110.

The term "module" is used herein for referring to a functional operation that can be embodied as either a stand-alone constituent element or an integrated configuration of a plurality of lower constituent elements. Thus, the program module 120 may be achieved as a single module or as a plurality of modules that operate in cooperation with one another. Moreover, while the program module 120 is described herein as being installed in the memory 115 and thus achieved in software, it is also possible to be achieved in any of hardware (for example, electronic circuit), firmware, software, or a combination thereof.

Although the program module 120 is illustrated as already being loaded into the memory 115, it may be configured to be located on a storage device 140 so as to be later loaded into the memory 115. The storage device 140 is a storage medium readable to a tangible computer storing the program module 120. Examples of the storage device 140 include a compact disc, a magnetic tape, a read-only memory, an optical storage medium, a memory unit composed of a hard drive or a plurality of parallel hard drives, and a universal serial bus (USB) flash drive. Alternatively, the storage device 140 may be a random access memory or another type of electronic storage device that is located in a remote storage system not illustrated and is connected to the computer 105 via the network 135.

The system 100 further includes a data source 150A and a data source 150B collectively referred to as a data source 150 herein and communicatively connected to the network 135. In practice, the data source 150 can include any number of data sources, that is, one or more data sources. The data source 150 can include unstructured data and include social media.

The system 100 further includes a user device 130 operated by a user 101 and connected to the computer 105 via the network 135. The user device 130 includes an input device, such as a keyboard, speech recognition subsystem or the like, for enabling the user 101 to transmit information and a selection of commands to the processor 110. The user device 130 further includes an output device, such as a display device, a printer, an audio synthesizer or the like. A cursor control unit, such as a mouse, a trackball, a touch sensitive screen or the like, allows the user 101 to manipulate the cursor on the display device to transmit additional information and a selection of commands to the processor 110.

The processor 110 outputs a result 122 of execution of the program module 120 to the user device 130. Alternatively, the processor 110 can provide output to a storage device 125, such as a database, a memory or the like, or can provide output to a remote device not illustrated via the network 135.

For example, a program for carrying out the flowchart of FIG. 7 may be the program module 120. The system 100 may be operated as the computing apparatus 10.

The term "includes", "including", "comprises", or "comprising" specifies that features, integers, steps, or constituent elements described therein are present, but it should be interpreted that the term does not exclude the presence of one or more other features, integers, steps, or constituent elements, or the presence of groups thereof. The terms "a" and "an" are indefinite articles and thus do not exclude embodiments having a plurality of constituent elements.

OTHER EMBODIMENTS

Note that the present disclosure is not limited to the above-described embodiments and can be variously modified and implemented within the scope not departing from the gist of the present disclosure. In short, the present disclosure is not limited to the higher-level embodiment as it is, and can be embodied, at the implementation stage, with the constituent elements modified within the scope not departing from the gist thereof.

Various inventions can be formed by appropriate combinations of a plurality of constituent elements disclosed in the above-described embodiments. For example, several constituent elements may be omitted from all the constituent elements illustrated in the embodiments. Furthermore, constituent elements in different embodiments may be appropriately combined with each other.

REFERENCE SIGNS LIST 10, 10-1 to 10-4: Computing apparatus
11: Main storage device
11a: Application unit
11b: Operating system
11c: Optical path controller
12: CPU
12a: Cache
13: External storage device
14: Direct memory access controller
15: Light signal processing unit
16: Light signal physical processing unit
50: Optical path
51: Optical switch
100: System
101: User
105: Computer
110: Processor
115: Memory
120: Program module
122: Result
125: Storage device
130: User device
135: Network
140: Storage device
150: Data source

The invention claimed is:

1. A data communication system having two computing apparatuses connected via an optical path, the data communication system comprising:
   a main storage device configured to drive an application unit having data to be transmitted and received between the two computing apparatuses;
   a light signal physical unit configured to transmit and receive a light signal frame having an error correction portion with respect to the optical path;
   a light signal processing unit configured to convert the data into the light signal frame and vice versa; and
   a direct memory access controller configured to cause the light signal frame to be transmitted and received via the optical path to transfer the data between the respective application unit of the two computing apparatuses by direct memory access or remote direct memory access.

2. The data communication system according to claim 1, further comprising
   an optical switch configured to establish the optical path.

3. The data communication system according to claim 2, further comprising
   an optical path controller configured to control connection of the optical switch and establish and delete the optical path.

4. A computing apparatus connected to another computing apparatus via an optical path, the computing apparatus comprising:
   a main storage device configured to drive an application unit having data to be transmitted and received between the computing apparatus and the other computing apparatus;
   a light signal physical unit configured to transmit and receive a light signal frame having an error correction portion with respect to the optical path;
   a light signal processing unit configured to convert the data into the light signal frame and vice versa; and
   a direct memory access controller configured to cause the light signal frame to be transmitted and received via the optical path to transfer the data between the respective application unit of the computing apparatus and the other computing apparatus by direct memory access or remote direct memory access.

5. A non-transitory computer-readable medium storing a program for causing a computer to operate as the computing apparatus according to claim 4.

6. A data communication method in a data communication system having two computing apparatuses connected via an optical path, the data communication method comprising:
   driving an application unit having data to be transmitted and received between the two computing apparatuses;
   transmitting and receiving a light signal frame having an error correction portion with respect to the optical path;
   converting the data into the light signal frame and vice versa; and
   transmitting and receiving the light signal frame via the optical path to transfer the data between the respective application unit of the two computing apparatuses by direct memory access or remote direct memory access.

* * * * *